United States Patent
Yasui

(10) Patent No.: US 10,752,229 B2
(45) Date of Patent: Aug. 25, 2020

(54) ELECTRIC BRAKING DEVICE FOR VEHICLE

(71) Applicant: ADVICS CO., LTD., Kariya-shi, Aichi-ken (JP)

(72) Inventor: Yoshiyuki Yasui, Nagoya (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 14 days.

(21) Appl. No.: 15/780,395

(22) PCT Filed: Dec. 5, 2016

(86) PCT No.: PCT/JP2016/086044
§ 371 (c)(1),
(2) Date: May 31, 2018

(87) PCT Pub. No.: WO2017/094914
PCT Pub. Date: Jun. 8, 2017

(65) Prior Publication Data
US 2018/0345935 A1    Dec. 6, 2018

(30) Foreign Application Priority Data

Dec. 4, 2015  (JP) ................................. 2015-237322

(51) Int. Cl.
*B60T 13/74*    (2006.01)
*B60T 7/10*    (2006.01)
(Continued)

(52) U.S. Cl.
CPC .............. *B60T 13/74* (2013.01); *B60T 1/062* (2013.01); *B60T 7/108* (2013.01); *B60T 7/122* (2013.01); *F16D 63/006* (2013.01)

(58) Field of Classification Search
CPC ...... B60T 13/741; B60T 17/221; B60T 13/74; B60T 1/062; B60T 7/108; B60T 7/122
See application file for complete search history.

(56) References Cited

U.S. PATENT DOCUMENTS

| 6,554,108 B1 * | 4/2003 | Bohm | ................... B60T 17/221 188/1.11 E |
| 6,959,794 B2 * | 11/2005 | Ralea | ..................... B60T 7/085 188/1.11 L |

(Continued)

FOREIGN PATENT DOCUMENTS

| JP | 10-267053 A | 10/1998 |
| JP | 5109807 B2 | 12/2012 |
| JP | 2015-107745 A | 6/2015 |

OTHER PUBLICATIONS

International Search Report (PCT/ISA/210) dated Feb. 28, 2017, by the Japanese Patent Office as the International Searching Authority for International Application No. PCT/JP2016/086044.

(Continued)

*Primary Examiner* — Bradley T King
*Assistant Examiner* — James K Hsiao
(74) *Attorney, Agent, or Firm* — Buchanan Ingersoll & Rooney PC

(57) ABSTRACT

An electric braking device includes: an electric motor for pressing a friction member against a rotary member that rotates integrally with a vehicle wheel; a lock mechanism for locking rotation of the electric motor and applying a parking brake in accordance with operation on a parking switch; and a control for driving the electric motor and the lock mechanism. The control increases the electricity amount sent to the electric motor when a pressing force is less than a preset lower value at the time the parking switch is switched from off to on, starts actuating the lock mechanism when the pressing force equals or exceeds the lower value, and, when the pressing force is greater than a preset upper value greater than or equal to the lower value, starts actuating the lock mechanism when the pressing force equals or exceeds the upper value.

2 Claims, 9 Drawing Sheets

(51) Int. Cl.
*F16D 63/00* (2006.01)
*B60T 1/06* (2006.01)
*B60T 7/12* (2006.01)

(56) References Cited

U.S. PATENT DOCUMENTS

| | | | | |
|---|---|---|---|---|
| 6,969,126 | B2* | 11/2005 | Ichinose | B60T 7/042 188/1.11 E |
| 10,138,960 | B2* | 11/2018 | Yasui | F16D 65/18 |
| 2003/0125863 | A1* | 7/2003 | Tamasho | B60T 13/741 701/70 |
| 2006/0170282 | A1* | 8/2006 | Yamaguchi | B60T 13/746 303/20 |
| 2006/0208565 | A1* | 9/2006 | O'Neill | B60T 8/325 303/152 |
| 2008/0084109 | A1* | 4/2008 | Griffith | B60T 7/12 303/89 |
| 2009/0218179 | A1* | 9/2009 | Yokoyama | B60T 13/741 188/1.11 L |
| 2010/0051395 | A1* | 3/2010 | Sano | B60T 1/005 188/162 |
| 2014/0069750 | A1* | 3/2014 | Nohira | B60T 13/741 188/71.8 |

OTHER PUBLICATIONS

Written Opinion (PCT/ISA/237) dated Feb. 28, 2017, by the Japanese Patent Office as the International Searching Authority for International Application No. PCT/JP2016/086044.

* cited by examiner

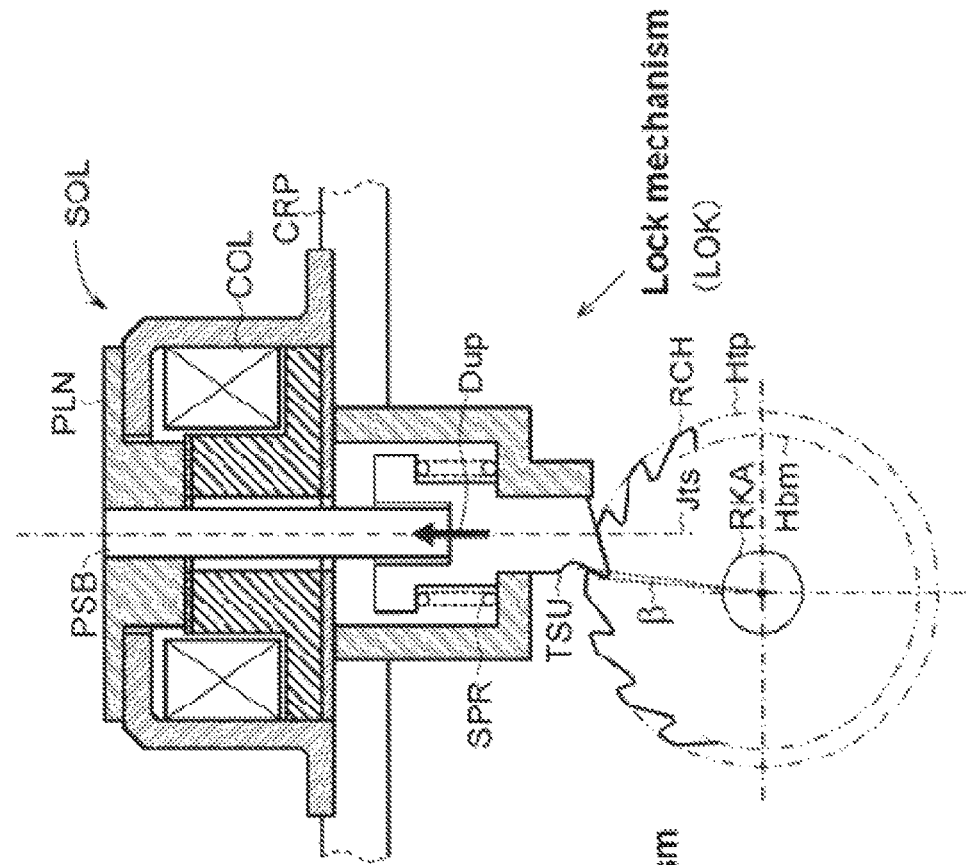
FIG. 3A Release maintaining state
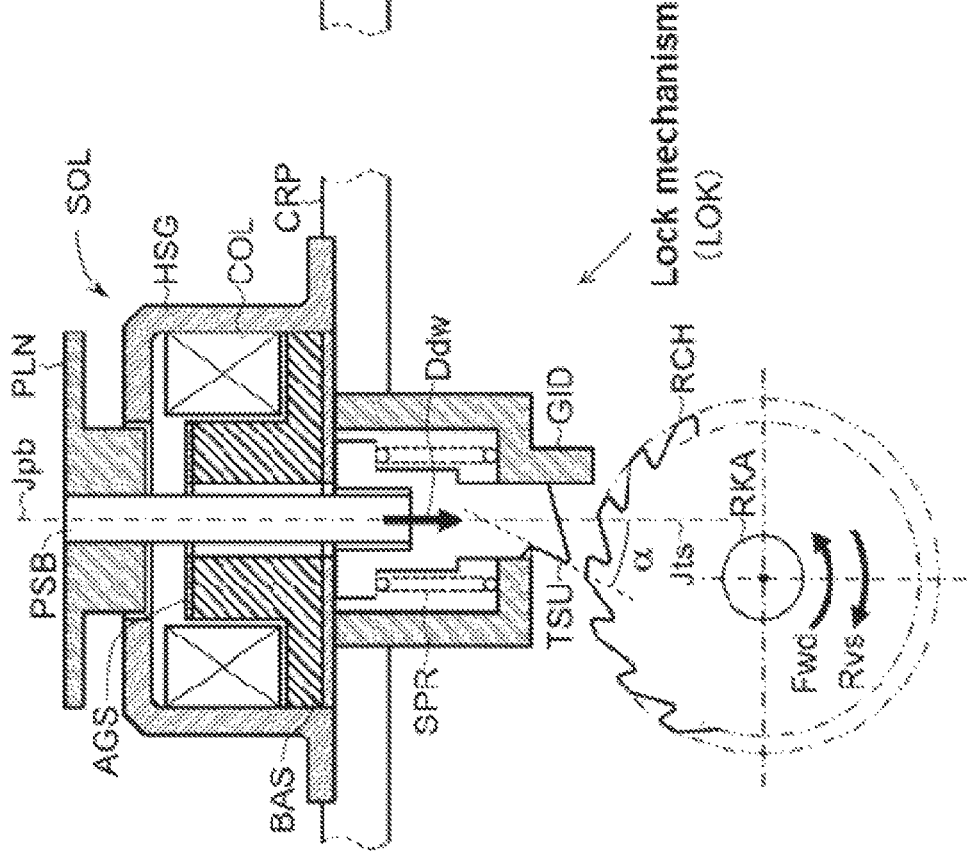
FIG. 3B Engagement instruction state

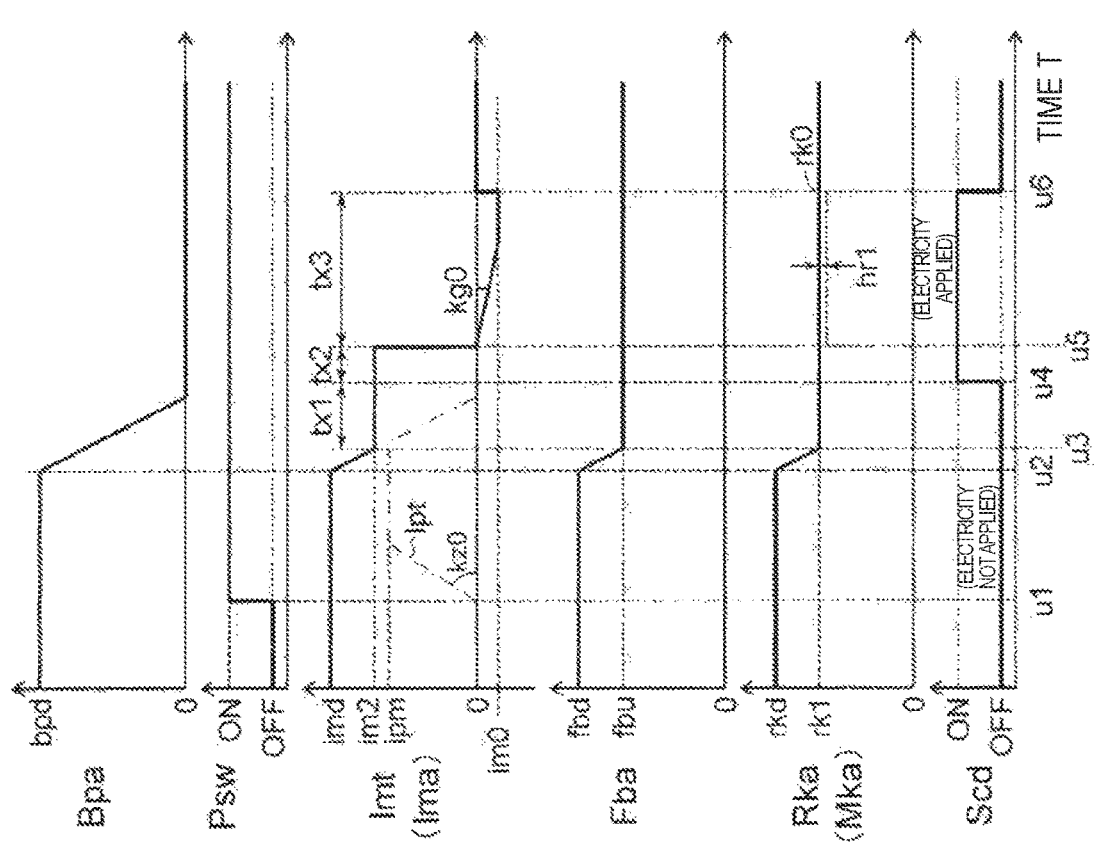
FIG. 8A WHEN Fba IS LESS THAN LOWER VALUE fbs AT THE TIME POINT WHEN PSW IS TURNED ON
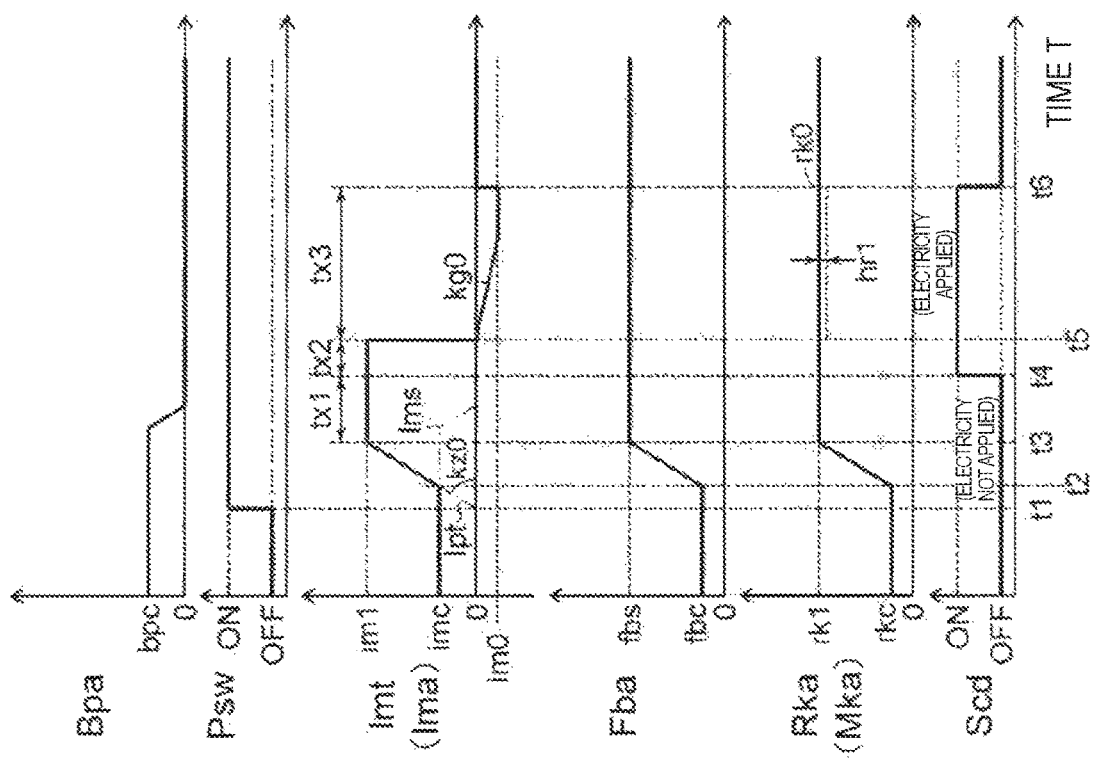
FIG. 8B WHEN Fba IS LARGER THAN VALUE fbu (≥ fbs) AT THE TIME POINT WHEN PSW IS TURNED ON

ELECTRIC BRAKING DEVICE FOR VEHICLE

TECHNICAL FIELD

The present invention relates to an electric braking device for a vehicle.

BACKGROUND ART

Patent Literature 1 describes a "drum-in-disk brake device that integrally forms a brake disk rotor with a brake drum, in which braking is performed by a disk brake device during running and braking is performed by a drum brake device during parking". In such a brake device, a service brake and a parking brake are operated independently, and thus the service brake and the parking brake do not interfere with each other.

The applicant develops an electric braking device in which service braking (braking performed by a driver's operation to step on a brake pedal) and parking braking (braking to maintain a halted state of a vehicle) are performed by a single electric motor, as described for example in Patent Literature 2. Here, the parking brake exhibits its function by restraining a motion of an electric motor MTR by a lock mechanism LOK configured of a ratchet wheel RCH and a hook member TSU. Moreover, to suppress interference between the service brake and the parking brake in the control of the electric motor MTR, larger one of a service brake target value Ims and a parking brake target value Ipk is selected as a final target value Imt by a selecting means SNT in determining a target electricity amount of the electric motor MTR.

In the electric braking device of Patent Literature 2, a situation will be assumed in which a driver switches a parking brake switch (parking switch) PSW from an off state to an on state under a state in which the driver is operating a braking operation member (brake pedal) BP at an excessively strong degree. In this case, an unnecessarily excessive force is applied to a caliper against a retaining force that maintains the halted state of the vehicle. Thus, strength of the caliper must be sufficiently ensured, which may bring forth size and weight increases in the electric braking device.

CITATIONS LIST

Patent Literatures

Patent Literature 1: JP H10-267053A
Patent Literature 2: JP 2015-107745 A

SUMMARY OF INVENTION

Technical Problems

An aim of the present invention is to provide an electric braking device configured of one electric motor and a lock mechanism in a vehicle wheel, which prevents control interference between a service brake and a parking brake, and capable of reducing size and weight of the device as a whole.

Solutions to Problems

An electric braking device for a vehicle according to the present invention includes: an electric motor (MTR) configured to press a friction member (MSB) against a rotary member (KTB), which rotates integrally with a vehicle wheel (WHL) of the vehicle, in accordance with an operation amount (Bpa) of a braking operation member (BP) by a driver of the vehicle; a lock mechanism (LOK) configured to actuate a parking brake in the vehicle by locking rotation of the electric motor (MTR) in accordance with a signal (Psw) of a parking switch (PSW) operated by the driver of the vehicle; a pressing force acquiring means (FBA) configured to acquire a pressing force (Fba) by which the friction member (MSB) presses the rotary member (KTB); and a control means (CTL) configured to drive the electric motor (MTR) and the lock mechanism (LOK).

Characteristics of the electric braking device for vehicle according to the present invention are in that in a case where the pressing force (Fba) is smaller than a preset lower value (fbs) when the parking switch (PSW) is switched from off to on, the control means (CTL) increases an amount of electricity (Imt, Ima) to the electric motor (MTR) and starts an operation of the lock mechanism (LOK) when the pressing force (Fba) becomes equal to or greater than the lower value (fbs), and in a case where the pressing force (Fba) is greater than a preset upper value (fbu) which is equal to or greater than the lower value (fbs) when the parking switch (PSW) is switched from off to on, the control means (CTL) starts the operation of the lock mechanism (LOK) when the pressing force (Fba) becomes equal to or smaller than the upper value (fbu).

In the electric braking device which prioritizes a service brake control which is based on a braking operation by a driver over a parking brake control, in a case where the braking operation member BP is strongly operated (for example, in the case where the pressing force Fba is equal to or greater than the upper value fbu), if the operation of the parking brake lock mechanism LOK is immediately started at the time point when the parking switch PSW is switched from off to on (which is termed a switching time point), the parking brake may come to be in an engagement maintaining state by the excessive pressing force. When the braking means BRK is designed to address such a situation, an overall size of the device may become large in order to secure strength of the braking means BRK.

According to the above configuration, in the case where the actual pressing force Fba is greater than the upper value fbu at the switching time point when the parking switch PSW is switched from off to on, the operation of the lock mechanism LOK is not started, and the operation of the lock mechanism LOK is started after having waited for the driver to release the BP and the actual pressing force Fba to become equal to or smaller than the upper value fbu. Due to this, the driver's braking operation is prioritized even in the case where the braking operation member BP is operated strongly, and the parking brake is brought to the engagement maintaining state at a proper pressing force (within a range from the lower value fbs to the upper value fbu). As a result, the brake actuator BRK is not demanded to have an excessive strength, and the electric braking device DSS may be reduced in its size and weight.

BRIEF DESCRIPTION OF DRAWINGS

FIGS. 3A and 3B are schematic diagrams for explaining a first embodiment of a lock mechanism for parking brake.

FIGS. 8A and 8B are time-series diagrams for explaining an engagement operation in the parking brake control.

DESCRIPTION OF EMBODIMENTS

Hereinbelow, an electric braking device for a vehicle according to an embodiment of the present invention will be described with reference to the drawings.

<Overall Configuration of Electric Braking Device for Vehicle According to an Embodiment of the Present Invention>

Figure 1:
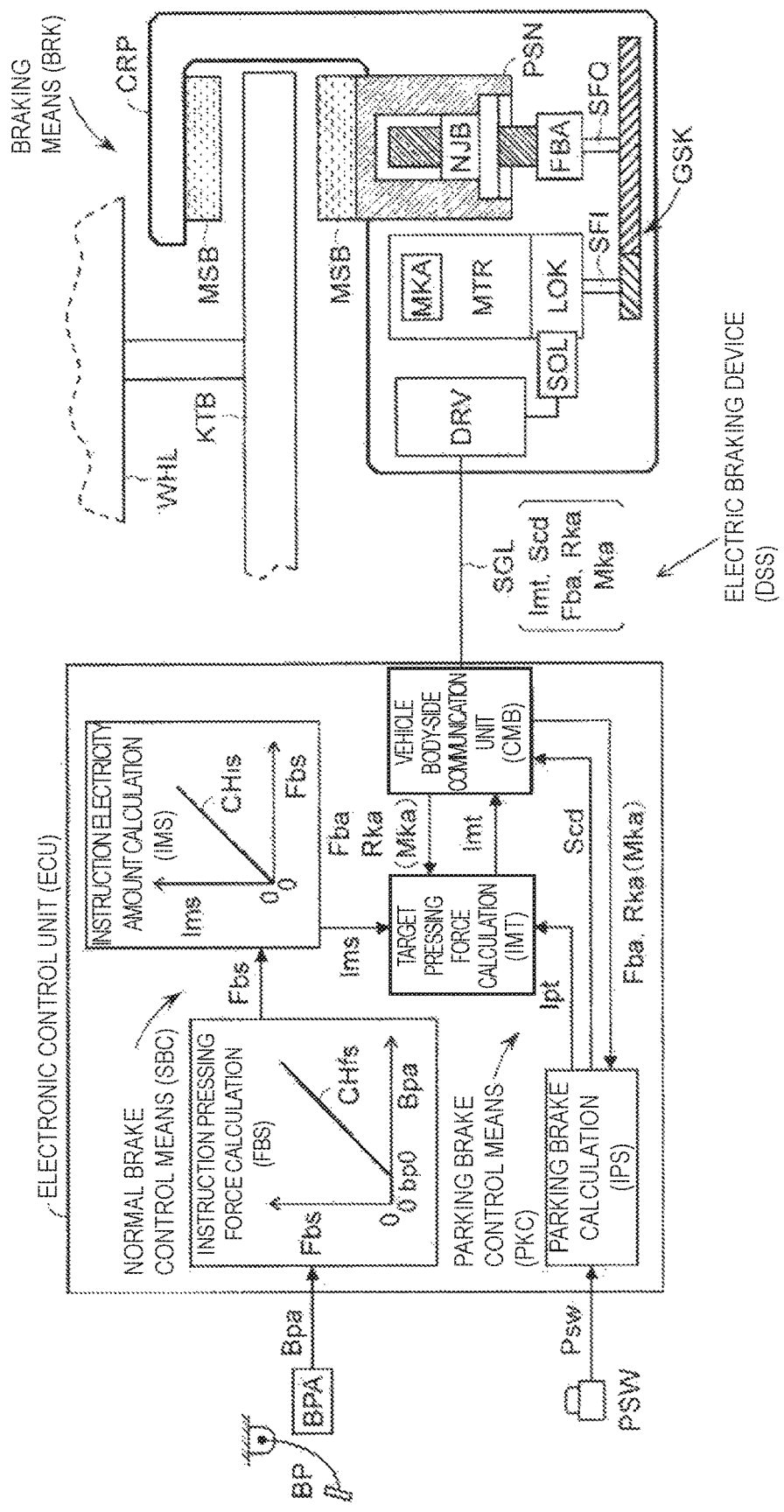
FIG. 1 is an overall configuration diagram of an electric braking device for a vehicle according to an embodiment of the present invention.

FIG. 1 is an overall configuration diagram of an electric braking device DSS according to an embodiment of the present invention. A vehicle is provided with the electric braking device DSS, a braking operation member BP, an operation amount acquiring means BPA, a parking brake switch PSW, a rotary member (for example, a brake disk or a brake drum) KTB, and friction members (for example, brake pads or brake shoes) MSB. The electric braking device DSS is configured of an electronic control unit ECU, a communication line SGL, and a braking means BRK.

The braking operation member (for example, a brake pedal) BP is a member that a driver operates to decelerate the vehicle. Braking torque of a vehicle wheel WHL is adjusted by the braking means BRK according to the operation of the braking operation member BP. As a result, a braking force is generated in the vehicle wheel WHL, and the running vehicle is thereby decelerated.

The braking operation member BP is provided with the operation amount acquiring means BPA. The operation amount acquiring means BPA allows an operation amount (braking operation amount) Bpa of the braking operation member BP to be acquired (detected). As the operation amount acquiring means BPA, at least one of a sensor (pressure sensor) that detects a pressure of a master cylinder, a sensor (pedaling sensor) that detects an operation force on the braking operation member BP, and a sensor (stroke sensor) that detects an operation displacement of the braking operation member BP is employed. Thus, the braking operation amount Bpa is calculated based on at least one of the master cylinder pressure, the brake pedaling force, and the brake pedal stroke. The detected braking operation amount Bpa is input to the electronic control unit ECU.

The parking brake switch (which may simply be termed a parking switch) PSW is a switch operated by the driver, and outputs an on or off signal Psw (termed a parking signal) to the electronic control unit ECU. That is, the driver instructs operation or release of the parking brake for maintaining a halted state of the vehicle by operating the parking switch PSW. Specifically, the operation of the parking brake is instructed by an on (ON) state of the parking signal Psw, and the release of the parking brake is instructed by an off (OFF) state of the parking signal Psw.

<<Electronic Control Unit ECU>>

The electronic control unit ECU is configured of an instruction pressing force calculation block FBS, an instruction electricity amount calculation block IMS, a parking brake calculation block IPS, a target electricity amount calculation block IMT, and a vehicle body-side communication unit CMB. Here, those related to the service brake for decelerating the vehicle to stop (the instruction pressing force calculation block FBS, the instruction electricity amount calculation block IMS, and the target electricity amount calculation block IMT) are termed a "service brake control means SBC", and those related to the parking brake for maintaining the halted state of the vehicle (the parking brake calculation block IPS and the target electricity amount calculation block IMT) are termed a "parking brake control means PKC". The electronic control unit ECU corresponds to a part of a control means (controller) CTL.

In the instruction pressing force calculation block FBS (corresponding to the service brake control means SBC), a target value (instruction pressing force) Fbs related to a force by which the friction members MSB press the rotary member KTB (pressing force) is calculated. Specifically, the instruction pressing force Fbs is calculated based on the braking operation amount Bpa and a preset calculation map CHfs so that the instruction pressing force Fbs exhibits a monotonic increase from zero as the braking operation amount Bpa increases. Here, the instruction pressing force Fbs is a target value Fbs in a service brake function, and is input from the instruction pressing force calculation block FBS to the instruction electricity amount calculation block IMS.

In the instruction electricity amount calculation block IMS, an instruction electricity amount Ims is calculated based on the target pressing force Fbs. The instruction electricity amount Ims is a target value of electricity amount to the electric motor MTR in service braking (that is, according to the driver's operation on the braking operation member BP). Specifically, the instruction electricity amount Ims is calculated based on the instruction pressing force Fbs and a preset calculation map CHis so that the instruction electricity amount Ims exhibits a monotonic increase from zero as the instruction pressing force Fbs increases. The instruction electricity amount Ims is input to the target electricity amount calculation block IMT.

In the parking brake calculation block IPS (corresponding to a parking brake control means PKC), signals Ipt (parking electricity amount) and Scd (instruction signal) for the parking brake control are calculated based on the parking signal Psw, the actual pressing force Fba, and the gear rotation angle Rka (or the motor rotation angle Mka). The parking electricity amount Ipt is input to the target electricity amount calculation block IMT and the instruction signal Scd is input to the vehicle body-side communication unit CMB.

In the target electricity amount calculation block IMT (corresponding to a service brake control means SBC and the parking brake control means PKC), a target electricity amount Imt being a target value of the electric application state to the electric motor MTR (which is in the end a magnitude and a direction of the current) based on the instruction electricity amount Ims (electricity application target value for service braking) Fbs and the parking electricity amount Ipt is calculated. Specifically, the instruction electricity amount Ims and the parking electricity amount Ipt are compared, and larger one of them is input to the vehicle body-side communication unit CMB as the target electricity amount Imt.

The rotation direction of the electric motor MTR is determined according to a sign of the target electricity amount Imt (the value thereof being positive or negative), and the output (rotational force) of the electric motor MTR is controlled based on a magnitude of the target electricity amount Imt. Specifically, in a case where the sign of the target electricity amount Imt is a positive sign (Imt>0), the electric motor MTR is driven in the forward direction (pressing force increasing direction), and in a case where the sign of Imt is a negative sign (Imt<0), the electric motor MTR is driven in the reverse direction (pressing force decreasing direction). Further, the output torque of the electric motor MTR is controlled to be larger when an absolute value of the target electricity amount Imt is larger, and the output torque is controlled to be smaller when the absolute value of the target electricity amount Imt is smaller.

Here, the "amount of electricity" is a state quantity (variable) for controlling the output torque of the electric motor MTR. Since the electric motor MTR outputs the torque that is substantially proportional to current, a current target value of the electric motor MTR may be used as the target value of the amount of electricity. Further, since the current increases as a result of increasing a supplied voltage to the electric motor MTR, a supplied voltage value may be used as the target electricity amount. Moreover, since the supplied voltage value may be modulated by a duty ratio in pulse width modulation, this duty ratio may be used as the amount of electricity. Details of the parking brake calculation block IPS and the target electricity amount calculation block IMT as aforementioned will be described later.

In the vehicle body-side communication unit CMB, signal transmission and reception are performed with a driving means DRV (especially a vehicle wheel-side communication unit CMW) in the braking means BRK via the communication line SGL. The target electricity amount Imt and the instruction signal Scd for the parking brake are sent from the vehicle body-side communication unit CMB to the vehicle wheel-side communication unit CMW. The actual pressing force Fba, the ratchet wheel rotation angle Rka, and the electric motor rotation angle Mka are sent from the vehicle wheel-side communication unit CMW to the vehicle body-side communication unit CMB.

The communication line SGL is a communication means between the electronic control unit ECU fixed to a vehicle body and the braking means BRK fixed to the vehicle wheel. A serial communication bus (for example, a CAN bus) may be used as the signal line SGL.

<<Braking Means (Brake Actuator) BRK>>

The braking means BRK is provided on the vehicle wheel WHL, and is configured to apply braking torque to the vehicle wheel WHL to generate a braking force. The vehicle that is running is decelerated by the braking means BRK (that is, it functions as the service brake). Further, the braking means BRK functions as the parking brake for maintaining the halted state during when the vehicle is parked.

As the braking means BRK, a configuration of a so-called disk-type braking device (disk brake) is exemplified. In this case, the friction members MSB are brake pads and the rotary member KTB is a brake disk. The braking means BRK may be a drum type braking device (drum brake). In a case of the drum brake, the friction members MSB are brake shoes and the rotary member KTB is a brake drum.

The braking means BRK (brake actuator) is configured of a brake caliper CRP, a pressing member PSN, the electric motor MTR, a position acquiring means MKA, a reduction gear GSK, an input member SFI, an output member SFO, a screw member NJB, a pressing force acquiring means FBA, a driving means DRV, and the parking brake lock mechanism LOK. The respective members as above (PSN and the like) are accommodated inside the brake caliper CRP.

As the brake caliper CRP (which may simply be termed a caliper), a floating type caliper may be employed. The caliper CRP is configured to hold the rotary member (brake disk) KTB by two friction members (brake pads) MSB. The pressing member (brake piston) PSN moves (forward or backward) relative to the rotary member KTB within the caliper CRP. The movement of the pressing member PSN causes the friction members MSB to be pressed against the rotary member KTB to generate a frictional force.

The movement of the pressing member PSN is performed by power from the electric motor MTR. Specifically, an output of the electric motor MTR (rotational force about a motor shaft) is transmitted to the output member SFO via the reduction gear GSK. Then, a rotational force (torque) of the output member SFO is converted to a linear force (thrust force along an axial direction of the pressing member) by the screw member NJB, and is transmitted to the pressing member PSN. As a result, the pressing member PSN is moved relative to the rotary member KTB. The force (pressing force) by which the friction members MSB press the rotary member KTB is adjusted by the movement of the pressing member PSN. Since the rotary member KTB is fixed to the vehicle wheel WHL, a frictional force is generated between the friction members MSB and the rotary member KTB, by which the braking force of the vehicle wheel WHL is adjusted.

The electric motor MTR is a power source for driving (moving) the pressing member PSN. For example, as the electric motor MTR, a motor with brush or a brushless motor may be employed. In a rotation direction of the electric motor MTR, a forward direction corresponds to a direction along which the friction members MSB approach the rotary member KTB (direction along which the pressing force increases and the braking torque increases), and a reverse direction corresponds to a direction along which the friction members MSB separate away from the rotary member KTB (direction along which the pressing force decreases and the braking torque decreases).

The position acquiring means (for example, a rotation angle sensor) MKA acquires (detects) the position (rotation angle) Mka of a rotor (rotator) of the electric motor MTR. The detected rotation angle Mka is input to the driving means DRV (specifically, a processor in the driving means DRV). The position acquiring means MKA also serves as a gear rotation angle acquiring means RKA to be described later. That is, the motor rotation angle Mka may be employed as the gear rotation angle Rka.

The pressing force acquiring means (for example, the pressing force sensor) FBA acquires (detects) a force (pressing force) Fba by which the pressing member PSN presses the friction members MSB. A detected actual pressing force Fba is input to the driving means DRV (specifically, the processor in the DRV). For example, the pressing force acquiring means FBA is provided between the output member SFO and the caliper CRP.

The driving means DRV (driving circuit) is an electric circuit configured to drive the electric motor MTR and the solenoid actuator SOL. The driving means DRV is configured of the processor (calculation processing device), a bridge circuit HBR, and the like. The driving means DRV controls the electric motor MTR based on the target electricity amount Imt, and the solenoid SOL is driven based on the instruction signal Scd.

The parking brake lock mechanism LOK (which may simply be termed a lock mechanism) locks the electric motor MTR in such a manner that the electric motor MTR does not rotate in a reverse direction for the brake function for maintaining the halted state of the vehicle (the so-called parking brake). The lock mechanism LOK restrains (restricts) the pressing member PSN from moving in a direction separating away from the rotary member KTB, and the pressing state of the rotary member KTB by the friction members MSB is thereby maintained. Here, the lock mechanism LOK may be provided between the electric motor MTR and the reduction gear GSK.

<Driving Means DRV>

Figure 2:
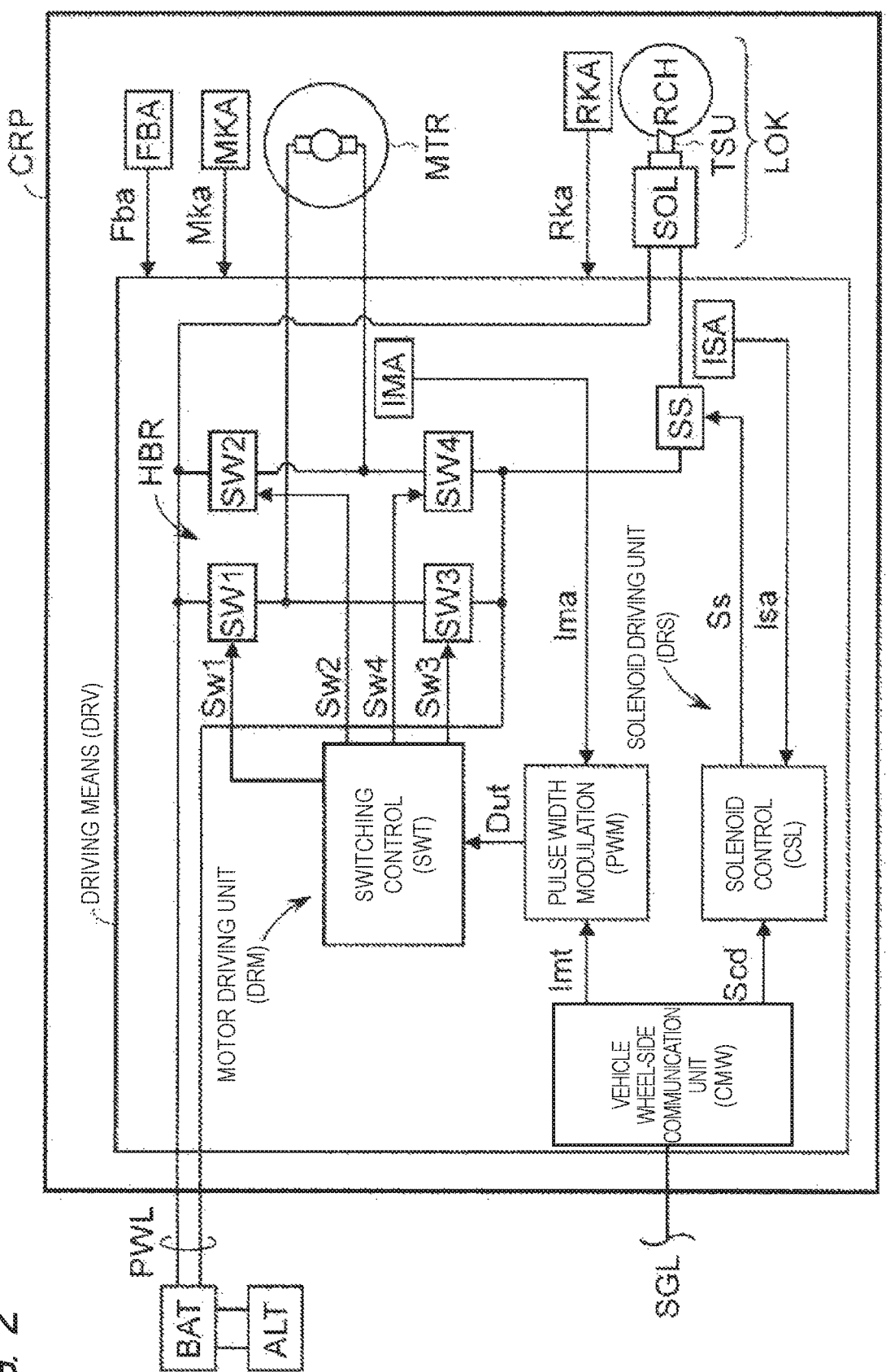
FIG. 2 is a schematic diagram for explaining a driving means.

The driving means DRV will be described with reference to a schematic diagram of FIG. 2. This is an example of the case where a motor with brush (which may simply be termed a brush motor) is employed as the electric motor MTR. The electric motor MTR and the solenoid SOL are driven by the driving means DRV. The driving means DRV is configured of the vehicle wheel-side communication unit CMW, a motor driving unit DRM, and a solenoid driving unit DRS. The driving means (driving circuit) DRV corresponds to a part of the control means (controller) CTL.

Power is supplied to the driving means DRV (driving circuit) from a rechargeable battery BAT and a dynamo ALT through power lines PWL. The acquired result (actual pressing force) Fba from the pressing force acquiring means FBA, the acquired result (motor rotation angle) Mka from the position acquiring means MKA, and the acquired result (gear rotation angle) Rka of the ratchet wheel from the rotation angle acquiring means RKA are input to the driving means DRV. Moreover, the signals Imt, Scd for controlling the electric motor MTR and the solenoid SOL are input to the driving means DRV (especially, the vehicle wheel-side communication unit CMW) from the electronic control unit ECU (especially, the vehicle body-side communication unit CMB) through a signal line SGL. On the other hand, the actual pressing force Fba, the gear rotation angle Rka, and the motor rotation angle Mka are output from the driving means DRV to the electronic control unit ECU through the signal line SGL.

<<Motor Driving Unit DRM>>

The motor driving unit DRM is configured of a bridge circuit HBR, a pulse width modulation block PWM, and a switching control block SWT.

The bridge circuit is a circuit that does not require bidirectional power sources, and by which the electricity application direction to the electric motor is changed by a single power source, and the rotation direction (the forward direction or the reverse direction) of the electric motor can thereby be controlled. The bridge circuit HBR is configured of the switching elements SW1 to SW4. The switching elements SW1 to SW4 are elements that can turn on (apply electricity to)/off (not apply electricity to) a part of an electric circuit. The switching elements SW1 to SW4 are driven by the signals Sw1 to Sw4 from the switching control block SWT. The rotation direction and the output torque of the electric motor MTR are adjusted by electricity-applied/nonapplied states of the respective switching elements being switched. For example, MOS-FETs and IGBTs may be used as the switching elements.

In the case where the electric motor MTR is driven in the forward direction, the switching elements SW1, SW4 are brought to the electricity applied state (on-state) and the switching elements SW2, SW3 are brought to the electricity nonapplied state (off-state). To the contrary, in the case where the electric motor MTR is driven in the reverse direction, the switching elements SW1, SW4 are brought to the electricity nonapplied state (off-state) and the switching elements SW2, SW3 are brought to the electricity applied state (on-state). That is, in a reverse drive of the electric motor MTR, the current is flown in a direction opposite to that for a forward drive.

In a case where a brushless motor is employed instead of the motor with brush, the bridge circuit HBR is configured of six switching elements. Similarly to the case with the motor with brush, the electricity applied state/electricity nonapplied state of the switching elements is controlled based on the duty ratio Dut. In the brushless motor, a rotor position (rotation angle) Mka of the electric motor MTR is acquired by the position acquiring means MKA. Then, the six switching elements configuring the three-phase bridge circuit are controlled based on this actual position Mka. The switching elements sequentially switch directions of U-phase, V-phase, and W-phase coil electricity amounts (that is, a magnetizing direction) of the bridge circuit, and the electric motor MTR is thereby driven. A rotation direction (forward or reverse direction) of the brushless motor is determined by the relation between a position where magnetic excitation is caused and the rotor.

The electricity amount acquiring means (for example, a current sensor) IMA for the electric motor is provided in the bridge circuit HBR. The electricity amount acquiring means IMA acquires the amount of electricity (actual value) Ima of the electric motor MTR. For example, a value of the current actually flowing in the electric motor MTR may be detected as the actual electricity amount Ima by the motor current sensor IMA.

In the pulse width modulation block PWM, an instruction value (target value) Dut for performing the pulse width modulation is calculated based on the target electricity amount Imt. Specifically, in the pulse width modulation block PWM, a pulse width duty ratio Dut (rate of the on-state within a cycle in periodic pulse waves) is determined based on the target electricity amount Imt and a preset characteristic (calculation map). Together with the above, in the pulse width modulation block PWM, the rotation direction of the electric motor MTR is determined based on the sign of the target electricity amount Imt (the positive sign or the negative sign). For example, the rotation direction of the electric motor MTR is set such that the forward direction is a positive (plus) value and the reverse direction is a negative (minus) value. Since a finalized output voltage is determined according to an input voltage (power source voltage) and the duty ratio Dut, the rotation direction of the electric motor MTR and the amount of electricity supplied to the electric motor MTR (that is, the output of the electric motor MTR) are determined in the pulse width modulation block PWM.

Moreover, in the pulse width modulation block PWM, a so-called current feedback control is executed. The detected value (for example, the actual current value) Ima of the electricity amount acquiring means IMA is input to the pulse width modulation block PWM, and the duty ratio Dut is corrected (slightly adjusted) based on a deviation eIm between the target electricity amount Imt and the actual electricity amount Ima. A highly accurate motor control can be achieved by this current feedback control to match the target value Imt and the actual value Ima.

In the switching control block SWT, signals (driving signals) Sw1 to Sw4 for driving switching elements SW1 to SW4 configuring the bridge circuit HBR are determined based on the duty ratio (target value) Dut. By these driving signals Sw1 to Sw4, electricity application/nonapplication and the electricity application time per unit time in each of the switching elements SW1 to SW4 are controlled. That is, the rotation direction and the output torque of the electric motor MTR are controlled by the driving signals Sw1 to Sw4.

<<Solenoid Driving Unit DRS>>

The solenoid driving unit DRS is configured of a switching element SS and a solenoid control block CSL. The switching element SS controls the electricity applied state of the solenoid SOL. Specifically, the switching element SS is an element that can turn on (apply electricity to)/off (not apply electricity to) a part of an electric circuit, and electricity applied/nonapplied states of the switching element SS are switched based on the driving signal Ss. Due to this, generation/release of the attracting force of the solenoid SOL are switched (that is, the solenoid SOL is driven). For example, an MOS-FET, an IGBT, or a relay may be used as the switching element SS.

In the solenoid control block CSL, the instruction signal Scd is converted to a solenoid driving signal Ss and is output to the switching element SS. The solenoid driving unit DRS is provided with an electricity amount acquiring means (for example, a current sensor) ISA for the solenoid. The electricity amount acquiring means ISA acquires an electricity amount (actual value) Isa of the solenoid SOL. For example, a value of the current actually flowing in the solenoid SOL can be detected as the actual electricity amount Isa by the solenoid current sensor ISA.

<First Embodiment of Parking Brake Lock Mechanism>

A first embodiment of the parking brake lock mechanism (which will simply be termed a lock mechanism) LOK will be described with reference to schematic diagrams of FIGS. 3A, 3B. The lock mechanism LOK of the first embodiment exhibits a function of the parking brake by the hook member TSU interlocking with the ratchet wheel RCH. Here, a case where the hook member TSU and the ratchet wheel RCH are interlocked (a case where the lock mechanism LOK is operating) is a state in which the parking brake is in effect, and a case where they are not interlocked (a case where the lock mechanism LOK is not operating) is a state in which the parking brake is not in effect.

Firstly, a structure of the lock mechanism LOK will be described. The lock mechanism LOK is configured as a ratchet mechanism (pawl brake). The ratchet mechanism restricts a rotating operation in one direction. Thus, in a state where the ratchet mechanism is interlocking, the lock mechanism LOK allows rotation in one direction (direction shown by an arrow Fwd) but restrains rotation in the other direction (direction shown by an arrow Rvs) (restricts movement therealong). FIG. 3A shows a parking brake release maintaining state (state in which the hook member TSU is at a release position) and FIG. 3B shows a parking brake engagement maintaining state (state in which the hook member TSU is at an interlocking position).

The lock mechanism LOK is configured of the solenoid actuator SOL, the hook member TSU, a guide member GID, the ratchet wheel RCH, and an elastic member SPR.

The solenoid actuator (which may simply be termed a solenoid) SOL is fixed to the caliper CRP. In a case where the lock mechanism LOK transitions from a released state to an interlocked state, the hook member TSU is pressed toward the ratchet wheel RCH by a push bar PSB which is a part of the solenoid SOL by electric application of the solenoid SOL. Specifically, the hook member TSU receives a force from the solenoid SOL in a direction (interlocking direction) Ddw approaching a rotation axis of the ratchet wheel RCH. The hook member TSU is positioned by the guide member GID fixed to the caliper CRP, and it is allowed to move only in the interlocking direction Ddw and an opposite direction (releasing direction) Dup. The parking brake function is exhibited by the hook member TSU interlocking with the ratchet wheel RCH.

The solenoid SOL is configured of a coil COL, a stationary iron core (which is also called a base) BAS, a movable iron core (which is also called a plunger) PLN, the push bar PSB, and a housing HSG. The coil COL and the base BAS are accommodated in the housing HSG, and the housing HSG is fixed to the caliper CRP. That is, the solenoid SOL is fixed to the caliper CRP.

The coil COL generates a magnetic field by a current being flown in a conduction line. When the magnetic field is generated in the coil COL by the electricity application, magnetic flux penetrates through the stationary iron core (base) BAS, and the BAS attracts the movable iron core (plunger) PLN. Further, the plunger PLN is attracted toward the base BAS at all times during the electricity application; however, when the electricity application is interrupted, this attracting force disappears. The push bar PSB is fixed to the plunger PLN, and the hook member TSU is pressed by the push bar PSB according to an attracting operation of the plunger PLN.

The hook member TSU is provided with a protrusion (pawl) at its one end. This protrusion portion interlocks with the ratchet wheel RCH. The other end of the hook member TSU abuts the push bar PSB. When the electricity application to the solenoid SOL is performed, the hook member TSU is pressed by the push bar PSB and is moved to the direction (interlocking direction) Ddw toward the ratchet wheel RCH.

A rake angle α is provided in a protruding shape (pawl shape) of the hook member TSU. Here, the rake angle α is an angle formed by a contact portion between the pawl of the hook member TSU and the ratchet wheel RCH, and the interlocking direction Ddw. In the state where the hook member TSU and the ratchet wheel RCH are interlocked, the hook member TSU receives a force from the ratchet wheel RCH at the contact portion with the ratchet wheel RCH. Since a component force of this force is applied in the interlocking direction Ddw by the rake angle α, the state in which the hook member TSU and the ratchet wheel RCH are interlocked is maintained even after the electricity application to the solenoid SOL has been terminated.

The ratchet wheel RCH is fixed to the input member SFI, and rotates integrally with the electric motor MTR. Unlike a general gear, the ratchet wheel RCH is formed with teeth having directionality (saw teeth-like teeth). Directionality regarding the motion of the ratchet wheel RCH about its rotation axis is generated by this "saw teeth-like" shape. Specifically, its rotary motion Fwd corresponding to the forward direction of the electric motor MTR (motion in the direction along which PSN approaches KTB, the Fba increases, and the braking torque increases) is permitted, but its motion Rvs corresponding to the reverse direction of the electric motor MTR (motion in the direction along which PSN separates away from KTB, the Fba decreases, and the braking torque decreases) is restrained (locked). When the ratchet wheel RCH and the hook member TSU are interlocked, the rotation (reverse direction Rvs) of the electric motor MTR corresponding to the direction along which the pressing member PSN (that is, the friction member MSB) separates away from the rotary member KTB is restricted.

An elastic member (for example, a return spring) SPR is provided between the guide member GID (that is, the caliper CRP) and the hook member TSU in a compressed state. Accordingly, the elastic member SPR presses the hook member TSU against the guide member GID (caliper CRP)

at all times in the opposite direction (releasing direction) Dup from the interlocking direction Ddw. The plunger PLN is pulled into the solenoid SOL by the solenoid SOL being applied with electricity, and the push bar PSB presses the hook member TSU in the interlocking direction Ddw. That is, a force in the interlocking direction Ddw (interlocking force) that a movable member PSB of the solenoid SOL exerts on the hook member TSU is generated. When the attracting force (interlocking force) of the solenoid SOL becomes larger than a pressing force by the elastic member SPR (being a spring force, which is a releasing force that presses TSU in the releasing direction Dup), the hook member TSU is moved to an interlocking position and the hook member TSU and the ratchet wheel RCH interlock with each other (see FIG. 3B). However, when the electricity application to the solenoid SOL stops, the attracting force of the solenoid SOL is lost, and the hook member TSU and the push bar PSB (plunger PLN) are returned to the release position by the elastic member SPR (see FIG. 3A).

The gear rotation angle acquiring means RKA that acquires (detects) the rotation angle (gear rotation angle) Rka of the ratchet wheel RCH is provided coaxially with the ratchet wheel RCH. That is, the gear rotation angle acquiring means RKA is fixed to the input member (input shaft) SFI from the electric motor MTR to the reduction gear GSK. The acquisition result (motor rotation angle) Mka of the motor rotation angle acquiring means (position acquiring means) MKA may be employed as the gear rotation angle Rka. Further, since a gear ratio of the reduction gear GSK is known, the gear rotation angle acquiring means RKA may be provided on the output member (output shaft) SFO of the reduction gear GSK. (For the above, see FIG. 1.)

<<State Transition in Interlocking Hook Member TSU and Ratchet Wheel RCH>>

A case where the hook member TSU and the ratchet wheel RCH transition from a state of not being interlocked to a state of being interlocked will be described. FIG. 3A shows the state in which the electricity application to the solenoid SOL is not performed and the hook member TSU and the ratchet wheel RCH are not interlocked (release maintaining state). Here, the hook member TSU is pressed against the solenoid SOL (or the caliper CRP) by the elastic force of the elastic member SPR. The position of the hook member TSU in this state (the position where TSU is separated utmost from RCH) is termed the "release position".

The electricity application to the electric motor MTR is performed and the electric motor MTR is driven in the forward direction Fwd, as a result of which the pressing force Fba is increased. Then, the electricity application to the solenoid SOL (that is, the coil COL) is started after the pressing force Fba has reached a predetermined value. The plunger PLN is attracted to the base BAS by this electricity application, and the plunger PLN is pulled in the interlocking direction Ddw. The push bar PSB fixed to the plunger PLN moves the hook member TSU in the interlocking direction Ddw by the attracting force of the solenoid SOL (that is, the interlocking force being the force by which PSB pushes TSU) becoming larger than the elastic force of the elastic member SPR (that is, the releasing force being the force that releases the interlocking of TSU and RCH). At this occasion, the movement of the hook member TSU is guided by the guide member GID.

The electric motor MTR is driven in the reverse direction Rvs in the state where the hook member TSU is in contact with the ratchet wheel RCH. As a result, the hook member TSU is surely interlocked with the ratchet wheel RCH. After this interlocked state has been confirmed, the electricity application to the solenoid SOL is stopped and the electricity application to the electric motor MTR is also stopped (the engagement maintaining state of FIG. 3B).

The hook member TSU is provided with the rake angle α (the angle formed by a center axis Jts of TSU and the contact portion between TSU and RCH), and the ratchet wheel RCH is provided with an inclination angle β (an angle formed by a line connecting a tooth tip of RCH and a rotation axis of RCH and the contact portion between TSU and RCH). A force from the ratchet wheel RCH (tangential force) acts on the hook member TSU (especially at the contact portion with the ratchet wheel RCH) by rigidity of the caliper CRP, the friction members MSB, and the like. Since a component force of a tangential force by the rake angle α acts in the interlocking direction Ddw, the interlocked state after termination of the electricity application can surely be maintained.

Next, a case where the hook member TSU and the ratchet wheel RCH transition from the state of being interlocked to the state of not being interlocked will be described. As shown in FIG. 3B, the state in which the hook member TSU and the ratchet wheel RCH are interlocked is maintained even in the state where the electricity application to the electric motor MTR and the solenoid SOL is not performed. This interlocked state is released when the electricity application to the electric motor MTR is performed. At this occasion, the electricity application to the solenoid SOL remains in a stopped state.

When the electric motor MTR is driven and rotated in the forward direction Fwd, the hook member TSU rides over a tooth of the ratchet wheel RCH with which it has been interlocked. At this occasion, the hook member TSU is moved to the release position by the elastic force (spring force) of the elastic member (compression spring) SPR in the direction (releasing direction) Dup separating away from the ratchet wheel RCH. Specifically, in the state where the ratchet wheel RCH and the hook member TSU are interlocked, when the ratchet wheel RCH rotates at a larger degree than an angle γ (which will be termed an "interlocking angle") formed by a line connecting the tooth tip of the ratchet wheel RCH and a rotation center of the ratchet wheel RCH and a line connecting a pawl tip of the hook member TSU and the rotation center of the ratchet wheel RCH, the interlocked state of the ratchet wheel RCH and the hook member TSU is released. As a result, the hook member TSU is pressed by the elastic member SPR and returns to the state shown in FIG. 3A. The interlocking angle γ is a value that is preset according to the angles α, β and a geometric relationship between the hook member TSU and the ratchet wheel RCH (a distance between the center axis Jts of the hook member TSU and a rotation axis Jrc of the ratchet wheel RCH).

<Control State of Parking Brake>

Figure 4:
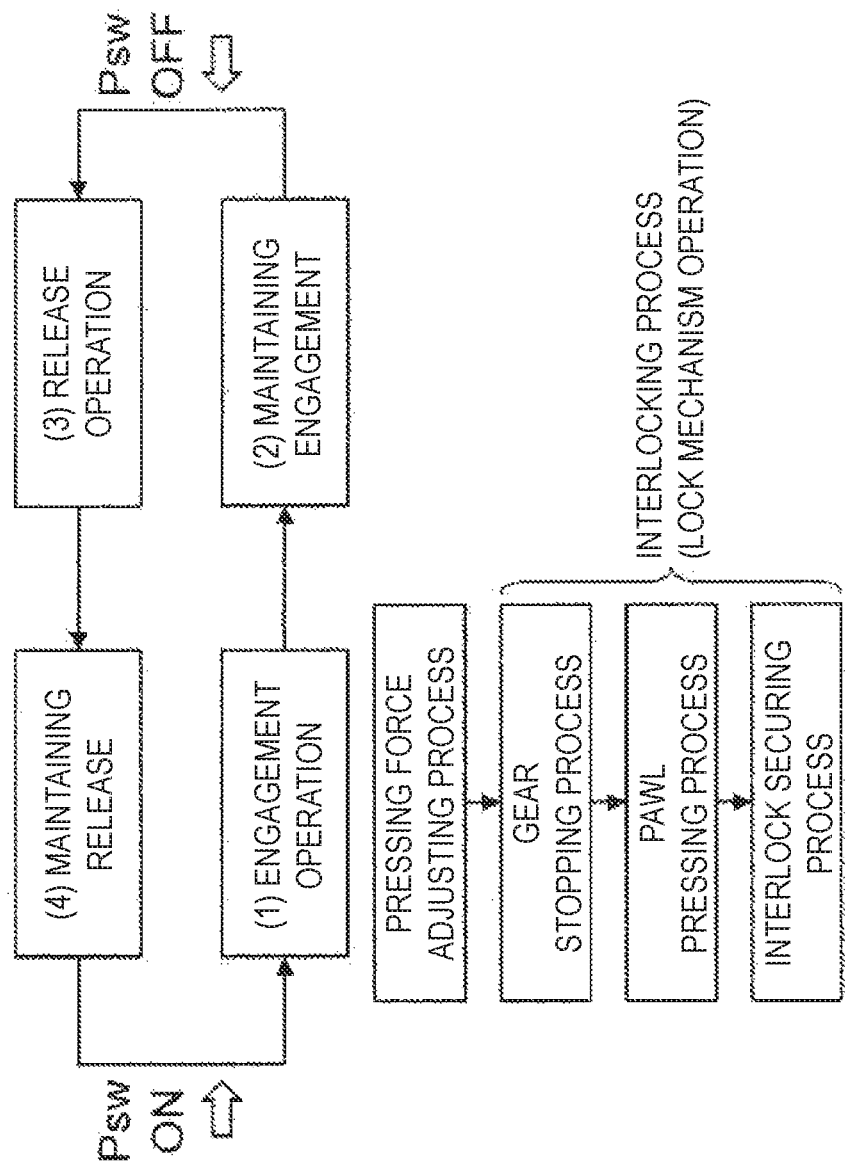
FIG. 4 is a state transition diagram for explaining an operating state of the parking brake.

With reference to a state transition diagram of FIG. 4, a control state in the parking brake control will be described. There are four states as the control state of the parking brake, namely "engagement operation", "maintaining engagement", "release operation", and "maintaining release".

The "maintaining engagement" is a case where the "state in which the hook member TSU and the ratchet wheel RCH are interlocked" is maintained. That is, in the engagement maintaining state, the parking brake lock mechanism LOK is actuated and the parking brake function is thereby exhibited. The "maintaining release" is a case where the "state in which the hook member TSU and the ratchet wheel RCH are not interlocked" is maintained. That is, in the release maintaining state, the parking brake lock mechanism LOK is not actuated and the parking brake function is not exhibited.

The "engagement operation" is an operation for making transition from the "state in which the hook member TSU and the ratchet wheel RCH are not interlocked" to the "state in which the hook member TSU and the ratchet wheel RCH are interlocked". To the contrary, the "release operation" is an operation for making transition from the "state in which the hook member TSU and the ratchet wheel RCH are interlocked" to the "state in which the hook member TSU and the ratchet wheel RCH are not interlocked".

In the release maintaining state, when the driver switches the parking switch PSW from the off-state to the on-state, the parking signal Psw also changes from the off-state to the on-state. The execution of the engagement operation is initiated based on this change. In the engagement operation, firstly an adjusting process for the pressing force of the friction members MSB on the rotary member KTB (pressing force adjusting process) is performed. Then, a stopping process for the ratchet wheel RCH (gear stopping process), a pressing process for the hook member TSU (pawl pressing process), and an interlock securing process for the hook member TSU and the ratchet wheel RCH are executed. The gear stopping process, the pawl pressing process, and the interlock securing process are collectively termed an "interlocking process", and this corresponds to the "operation of the lock mechanism".

As the interlocking process, specifically, in a state in which the electricity application state to the electric motor MTR is made constant and the rotary motion of the ratchet wheel RCH is stopped, after applying electricity to the solenoid SOL and pressing the hook member TSU against the ratchet wheel RCH, the parking brake control means PKC adjusts the electricity application state so that the electric motor MTR rotates in the direction by which the pressing force Fba is reduced.

When the execution of the engagement operation (that is, the interlocking process) is completed, the parking brake comes to be in the engagement maintaining state. In this state, the electricity application to the electric motor MTR and the solenoid SOL is not necessary.

In the engagement maintaining state, when the driver switches the parking switch PSW from the on-state to the off-state, the parking signal Psw also changes from the on-state to the off-state. The execution of the release operation is initiated based on this change. Then, when the release operation is completed, the parking brake release-maintaining state takes place.

<Parking Brake Control>

Figure 5:
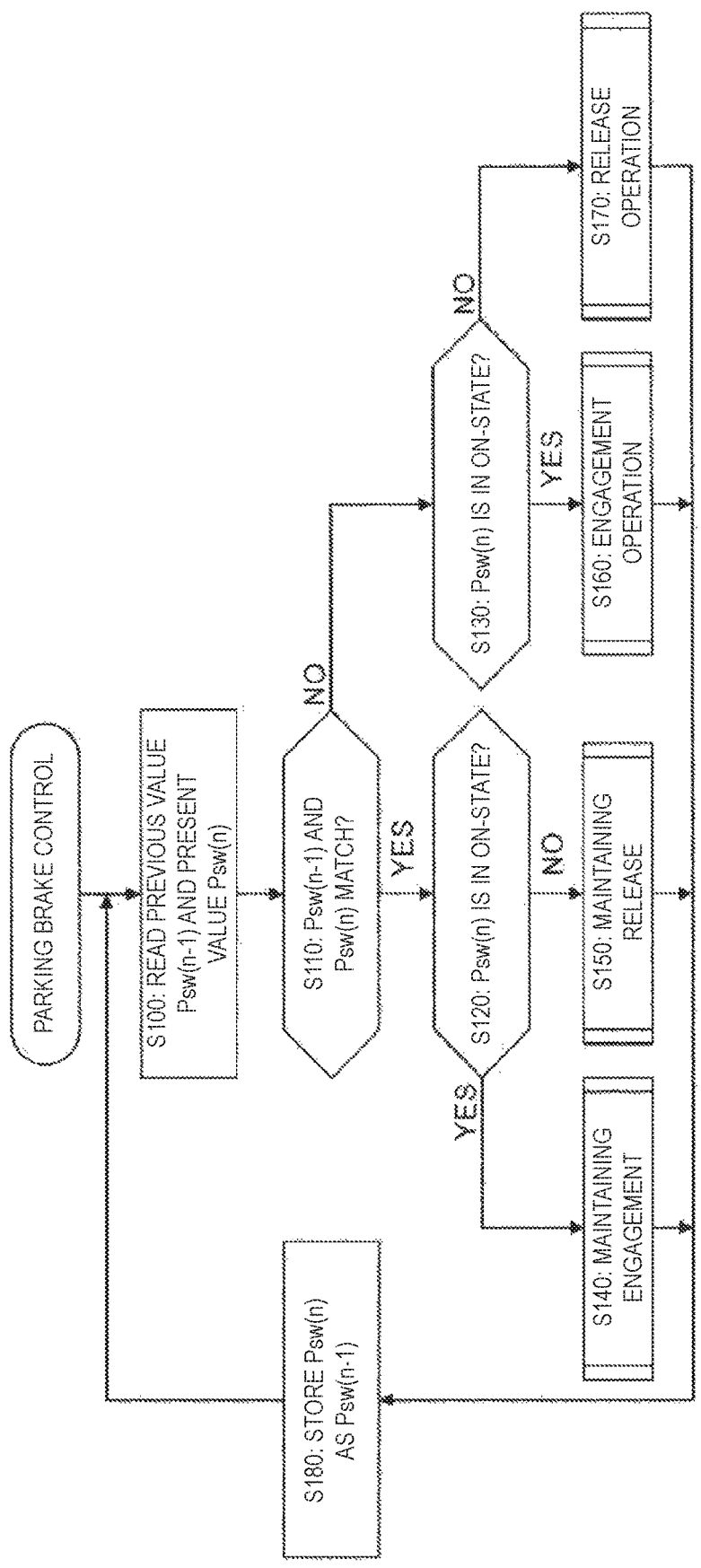
FIG. 5 is a flowchart for explaining an overview of a parking brake control.

An overview of the parking brake control will be described with reference to a flowchart of FIG. 5. In the parking brake control, one of the aforementioned four control states (the engagement operation state, the engagement maintaining state, the release operation state, and the release maintaining state) is selected based on the parking signal Psw.

In step S100, a previous value Psw(n−1) of the parking signal Psw obtained in a previously-performed calculation cycle and a present value Psw(n) thereof obtained in a presently-performed calculation cycle are read. Then, the process proceeds to step S110. In step S110, the previous value Psw(n−1) and the present value Psw(n) are compared. In a case where the previous value Psw(n−1) and the present value Psw(n) match (case of "YES"), the process proceeds to step S120. On the other hand, in a case where the previous value Psw(n−1) and the present value Psw(n) do not match (case of "NO"), the process proceeds to step S130.

In step S120, a determination is made on whether or not the parking signal Psw(n) is in the on-state in the present calculation cycle. In a case where the parking signal Psw(n) is in the on-state (case of "YES"), the process proceeds to step S140. On the other hand, in a case where the parking signal Psw(n) is in the off-state (case of "NO"), the process proceeds to step S150. In step S130, similarly to step S130, the determination is made on whether or not the present value Psw(n) is in the on-state. In the case where the parking signal Psw(n) is in the on-state (case of "YES"), the process proceeds to step S160. On the other hand, in the case where the parking signal Psw(n) is in the off-state (case of "NO"), the process proceeds to step S170.

In step S140, the engaged state is maintained (the control state of the parking brake is in the engagement maintaining state). In step S150, the released state is maintained (the control state is in the release maintaining state). In step S160, the engagement operation is performed (the control state is in the engagement operation state). In step S170, the release operation is performed (the control state is in the release operation state). The process proceeds to step S180 after the processes of steps S140 to S170, and the present value Psw(n) is stored as the previous value Psw(n−1). Then, the process is returned to step S100.

<Pressing Force Adjusting Process>

Figure 6:
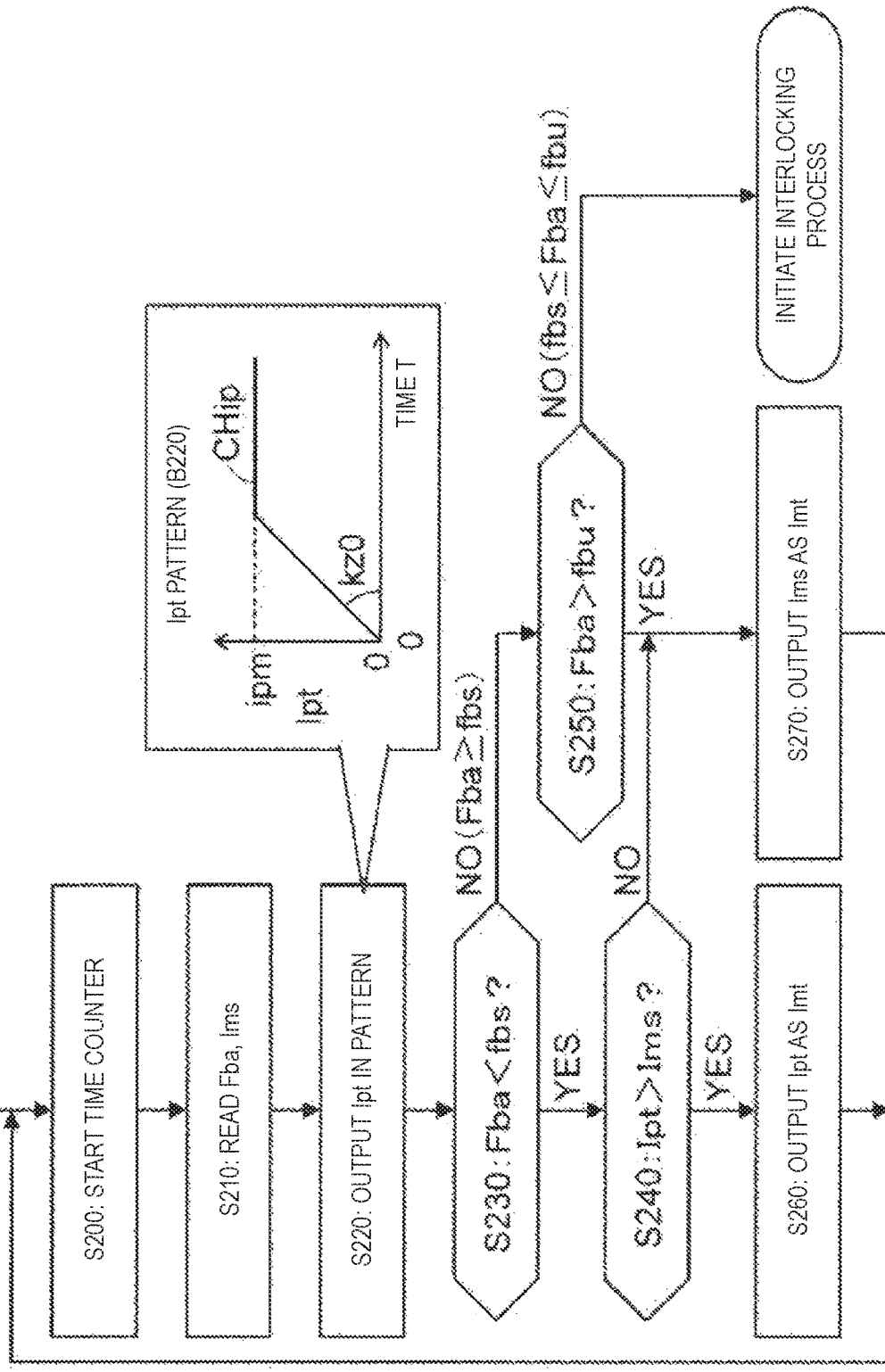
FIG. 6 is a flowchart for explaining a pressing force adjusting process in an engagement operation in the parking brake control.

The pressing force adjusting process in the engagement operation of the parking brake control will be described with reference to a flowchart of FIG. 6. When the previous value Psw(n−1) is in the off-state and the present value Psw(n) is in the on-state in the parking signal, the process proceeds to step S160 and the engagement operation is initiated (see FIG. 5).

Firstly in step S200, a time counter (timer) is started. Then, proceeding to step S210, the pressing force Fba and the instruction electricity amount Ims are read. Then, proceeding to step S220, the parking electricity amount Ipt is output in pattern. The parking electricity amount Ipt is a target value of the amount of electricity to the electric motor MTR for the parking brake control. Specifically, as shown by a time-series characteristic CHip of the block B220, the parking electricity amount Ipt is output such that it increases at a time gradient kz0 with the time point when the time counter is started as zero (starting point), and reaches an upper limit value ipm. Here, the upper limit value ipm is set with consideration to a power transmission efficiency in the brake actuator BRK to ensure that the actual pressing force Fba becomes larger than a value fbu to be described later.

In step S230, a determination is made on whether or not the actual pressing force Fba is smaller than a lower value (predetermined threshold) fbs. In a case where the pressing force Fba is smaller than the value fbs (case of "YES"), the process proceeds to step S240. Here, the lower value fbs is a preset predetermined value. On the other hand, in a case where the pressing force Fba is equal to or larger than the value fbs (case of "NO"), the process proceeds to step S250. In step S240, a determination is made on whether or not the parking electricity amount Ipt is larger than the instruction electricity amount Ims. In a case where the parking electricity amount Ipt is larger than the instruction electricity amount Ims (case of "YES"), the process proceeds to step S260. In a case where the parking electricity amount Ipt is equal to or less than the instruction electricity amount Ims (case of "NO"), the process proceeds to step S270.

In step S250, a determination is made on whether or not the pressing force Fba is larger than the upper value (predetermined threshold) fbu. Here, the upper value fbu is a preset predetermined value that is equal to or larger than the lower value fbs. In a case where the pressing force Fba is larger than the value fbu (case of "YES"), the process proceeds to step S270. In a case where the pressing force Fba is equal to or less than the value fbu (case of "NO"), the pressing force adjusting process of the engagement operation is completed, and the interlocking process of the engagement operation is initiated.

In step S260, the parking electricity amount Ipt is output as the target electricity amount Imt. That is, in step S260, the target electricity amount Imt is determined by the parking brake control means PKC. After this, the process is returned to step S200. In step S270, the instruction electricity amount Ims is output as the target electricity amount Imt. That is, in step S270, the target electricity amount Imt is determined by the service brake control means SBC. After this, the process is returned to step S200.

As described with reference to the flowcharts as above, in the pressing force adjusting process of the engagement operation, larger one of the parking electricity amount Ipt and the instruction electricity amount Ims is output as the target electricity amount Imt under a condition in which the pressing force Fba is smaller than the lower value fbs (≤fbu). Under a condition in which the pressing force Fba is larger than the upper value fbu (≥fbs), the instruction electricity amount Ims is output as the target electricity amount Imt. In other words, the driver's operation on the braking operation member BP (service brake operation) is prioritized over the parking brake in the case of Fba>fbu. The pressing force adjusting process is completed at a time point when a condition that the pressing force Fba is equal to or larger than the lower value fbs and equal to or less than the upper value fbu is met, and the interlocking process is initiated. That is, the interlocking process is initiated upon when the pressing force Fba enters a range between the value fbs and the value fbu.

<Interlocking process (Operation of Lock Mechanism LOK)>

Figure 7:
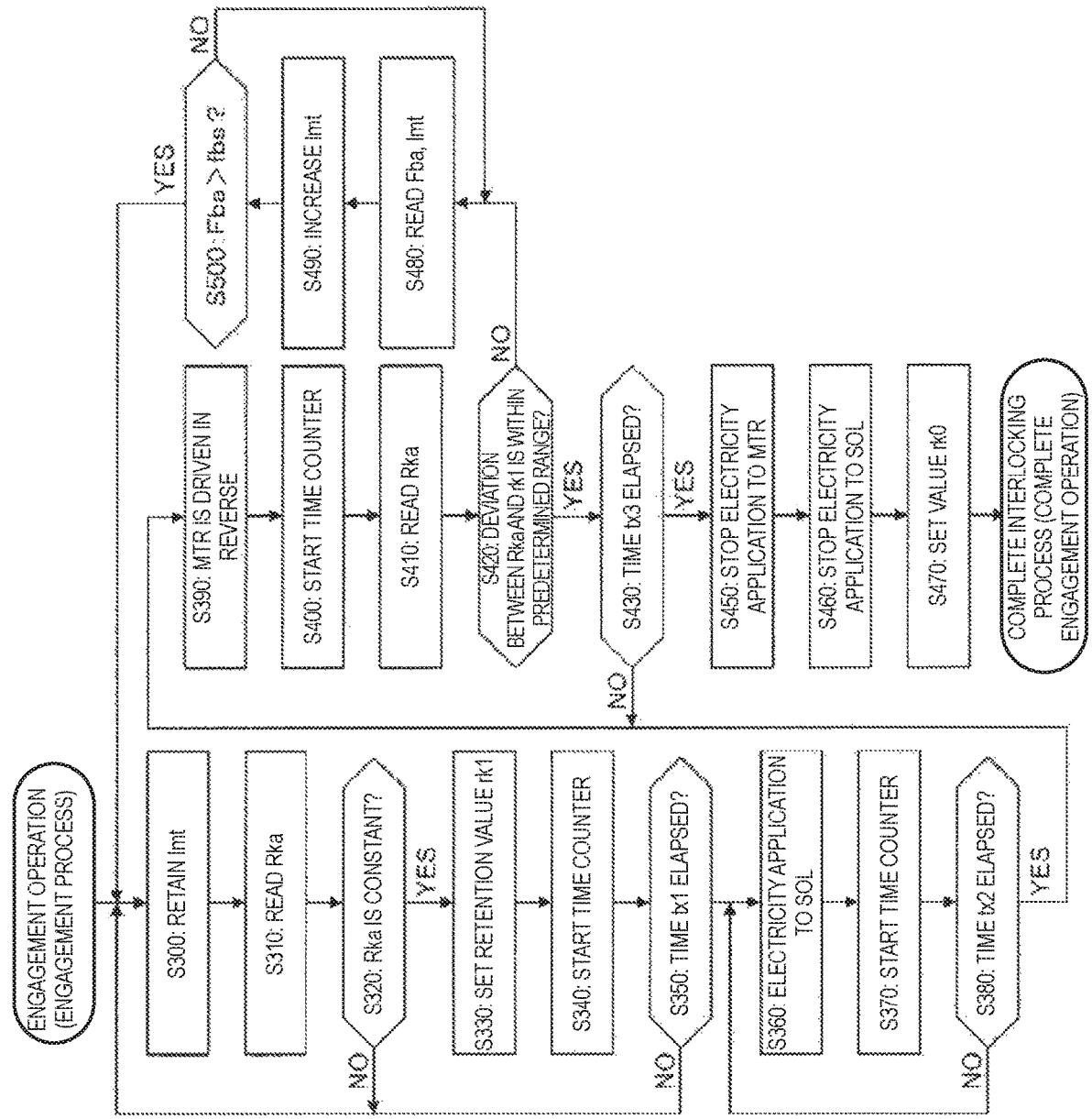
FIG. 7 is a flowchart for explaining an interlocking process in the engagement operation in the parking brake control.

The interlocking process in the engagement operation of the parking brake control will be described with reference to a flowchart of FIG. 7. When the pressing force adjusting process in the engagement operation is completed, the interlocking process in the engagement operation is initiated. The interlocking process in the engagement operation is executed by the parking brake control means PKC. Here, the interlocking process in the engagement operation corresponds to the "operation of the lock mechanism".

Firstly, in step S300, the target electricity amount Imt is retained at a value at that time point (upon the completion of the pressing force adjusting process). Then, in step S310, the rotation angle (gear rotation angle) Rka of the ratchet wheel RCH is read. Next, in step S320, a determination is made on whether or not the gear rotation angle Rka is constant. That is, a determination is made on whether or not the ratchet wheel RCH is in a stationary state based on the gear rotation angle Rka. In a case where the gear rotation angle Rka is determined to be constant in step S320 (case of "YES"), the process proceeds to step S330. In a case where the gear rotation angle Rka is determined to be not constant in step S320 (the ratchet wheel RCH is still rotating) (case of "NO"), the process is returned to step S300.

In step S330, the gear rotation angle Rka at a time point when an affirmative determination is made in step S320 is set as a value rk1. Here, the value rk1 is termed a "retention value". Next, in step S340, the time counter (timer) is started. Then in step S350, a determination is made on whether or not a time tx1 has elapsed since the time counter started. In a case where the constant state of the gear rotation angle Rka has continued over the time tx1 (case of "YES"), the process proceeds to step S360. On the other hand, in a case where the constant state of the gear rotation angle Rka has not continued over the time tx1 (case of "NO"), the process is returned to step S300. The processes from step S300 to step S350 are for stopping the rotary motion of the ratchet wheel RCH and confirming its halted state, and thus they are called "gear stopping process".

The electricity application to the solenoid SOL is performed in step S360. In S370, similarly to the above, the time counter is started. In step S380, a determination is made on whether or not a time tx2 has elapsed since the time counter started. In a case where the electricity application time for the solenoid SOL has reached the time tx2 (case of "YES"), the process proceeds to step S390. On the other hand, in a case where the electricity application time for the solenoid SOL is less than the time tx2 (case of "NO"), the process returns to step S360. Processes from step S360 to step S380 are for surely pressing the hook member TSU against the ratchet wheel RCH, and are called the "pawl pressing process".

In step S390, the electric motor MTR is driven in the reverse direction. That is, a preset electricity application (with the electricity amount of a negative sign) is performed so that the electric motor MTR rotates in the reverse direction. The time counter is started in step S400 and the gear rotation angle Rka is read in step S410. In step S420, a determination is made on whether or not a deviation between the retention value rk0 set in step S330 and the gear rotation angle Rka is within a predetermined range. In a case where a difference between the retention value rk0 and the gear rotation angle Rka is equal to or less than a value hr1 and is within the predetermined range (case of "YES"), the process proceeds to step S430. On the other hand, in a case where the difference between the retention value rk0 and the gear rotation angle Rka is outside the predetermined range (case of "NO"), the process proceeds to step S480. Processes from step S390 to step S430 are for surely interlocking the hook member TSU and the ratchet wheel RCH and confirming a state thereof, and are called the "interlock securing process".

When the condition of step S430 is met, the electricity application to the electric motor MTR is terminated in step S450, and the electricity application to the solenoid SOL is terminated in step S460. Then, the gear rotation angle Rka at the time point is set as a value rk0, and the interlocking process of the engagement operation is completed. Here, the value rk0 is called a "release value". The release value rk0 is employed for a determination on whether or not the ratchet mechanism is interlocking.

A case where the condition of step S430 is denied is a case where the hook member TSU and the ratchet wheel RCH have not interlocked. Due to this, the pressing force Fba and the target electricity amount Imt are read in step S480, and the target electricity amount Imt is increased by a predetermined value imx in step S490. In step S500, a determination is made on whether or not the pressing force Fba is larger than the lower value fbs. In a case where the pressing force Fba is larger than the value fbs (case of "YES"), the process returns to step S300 and the interlocking process is reinitiated. On the other hand, in a case where the pressing force Fba is equal to or less than the value fbs (case of "NO"), the process returns to step S480, where the target electricity amount Imt is increased by further adding the predetermined value imx thereto. According to processes of steps S420, S480 to S500, the pressing force upon the parking braking within the predetermined range can be ensured.

<Engagement Operation in Parking Brake Control>

The engagement operation of the parking brake control will be described with reference to time-series diagrams of FIGS. 8A, 8B (transition diagrams relative to time T). FIG. 8A shows a case where the pressing force Fba is less than the lower value fbs (preset predetermined value) when the parking switch PSW is switched from off to on. Further, FIG. 8B shows a case where the pressing force Fba is larger than the upper value fbu (preset predetermined value equal to or larger than the lower value fbs) when the parking switch PSW is switched from off to on.

Firstly, a case where the actual pressing force Fba is smaller than the lower value (threshold) fbs when the parking switch PSW is turned on will be described with reference to FIG. 8A. At a time point t1, the vehicle is halted, the driver's operation amount Bpa of the braking operation member BP is at a value bpc, and the actual pressing force Fba corresponding to this operation amount bpc is a value fbc which is smaller than the lower value fbs. At this time point t1, the driver switches the parking switch PSW from off to on. By this operation, the parking signal Psw is switched from off to on. The control state of the parking brake is switched from the release maintaining state to the engagement operation state in accordance with the change (transition) in the parking signal Psw. That is, the pressing force adjusting process of the engagement operation is initiated, the parking electricity amount Ipt is output at a preset pattern (the increasing gradient kz0 relative to time), the parking electricity amount Ipt and the instruction electricity amount Ims are compared, and the larger one of them is determined as the target electricity amount Imt.

Specifically, the instruction electricity amount Ims is employed as the target electricity amount Imt from the time point t1 to a time point t2 since the instruction electricity amount Ims according to the operation amount Bpa is larger than the parking electricity amount Ipt. Since the parking electricity amount Ipt increases as the time elapses, the parking electricity amount Ipt becomes equal to or larger than the instruction electricity amount Ims at the time point t2, and the parking electricity amount Ipt is employed as the target electricity amount Imt. At the time point t2 and thereafter, the parking electricity amount Ipt is employed as the target electricity amount Imt, and the target electricity amount Imt (which is as a result the actual electricity amount Ima) is sequentially increased. Here, the actual electricity amount Ima overlaps with the target electricity amount Imt since control is performed by the electricity amount feedback control so that the target value Imt and the actual value Ima of the electricity amount match each other.

At a time point t3, when the condition that the actual pressing force Fba is equal to or larger than the lower value fbs (Fba≥fbs) is met, the rotary motion of the ratchet wheel RCH (that is, the electric motor MTR) stops, and thus the target electricity amount Imt is maintained at a constant value im1. Here, the time point t3 corresponds to "initiation of the operation of the lock mechanism LOK". At a time point t4 when the halted state of the gear rotation angle Rka is confirmed to have continued over the predetermined time tx1, the electricity application to the solenoid SOL is started to interlock the hook member TSU with the ratchet wheel RCH. The solenoid SOL must press the hook member TSU against the elastic force of the elastic member (return spring) SPR. Due to this, the hook member TSU is not moved to the ratchet wheel RCH in an instant. In order to ensure the contact between the hook member TSU and the ratchet wheel RCH, the electricity application to the solenoid SOL in the state where the target electricity amount Imt is maintained is continued over the predetermined time tx2. The value of the gear rotation angle Rka for the case where the gear rotation angle Rka maintains its constant state (the gear rotation angle Rka at a time point when the rotation of the ratchet wheel RCH is confirmed to have stopped) is stored (set) as the retention value rk1.

At a time point t5 when the predetermined time tx2 has elapsed, the electric motor MTR is driven in reverse (rotation in the Rvs direction) so as to ensure the interlock between the hook member TSU and the ratchet wheel RCH. Specifically, the target electricity amount Imt is reduced dynamically from the value im1 to zero at the time point t5. Then, at the time point t5 and thereafter, the target electricity amount Imt is gradually reduced to a negative direction (direction by which the electric motor MTR is driven in reverse) at a decreasing gradient kg0 relative to time.

From the time point t5, the change in the gear rotation angle Rka is monitored whether or not it is within a predetermined range. Specifically, the deviation between the retention value rk1 and the gear rotation angle Rka is calculated, and the determination is made on whether or not this deviation is equal to or less than the value (predetermined threshold) hr1. In a case where the state in which the deviation between the gear rotation angle Rka and the retention value rk0 is in the state of being less than the predetermined value hr1 (state of being within the predetermined range) has continued over the predetermined time tx3, the electricity application to the solenoid SOL and the electric motor MTR is terminated at a time point t6. That is, at the time point t6, the engagement operation state (interlocking process) is completed and the engagement maintaining state is initiated. The gear rotation angle Rka at the time point t6 is stored (set) as the release value rk0.

Next, a case where the actual pressing force Fba is larger than the upper value (threshold) fbu when the parking switch PSW is turned on will be described with reference to FIG. 8B. At a time point u1, the vehicle is halted, the driver's operation amount Bpa of the braking operation member BP is at a value bpd, and the actual pressing force Fba corresponding to this operation amount bpd is a value fbd which is larger than the upper value fbu (≥fbd).

Similarly to the case of FIG. 8A, the driver switches the parking switch PSW from off to on at the time point u1. By this operation, the parking signal Psw is switched from off to on. The control state of the parking brake is switched from the release maintaining state to the engagement operation state in accordance with the change (transition) in the parking signal Psw. That is, the pressing force adjusting process of the engagement operation is initiated. Since the condition "Fba>fbu" is met, the instruction electricity amount Ims according to the operation amount Bpa is employed as the target electricity amount Imt. At the time point u1 and thereafter as well, the target electricity amount Imt does not decrease until the driver reduces the operation amount Bpa of the braking operation member BP. Here, the actual electricity amount Ima overlaps with the target electricity amount Imt since control is performed by the electricity amount feedback control so that the target value Imt and the actual value Ima of the electricity amount match each other.

At a time point u2, when the driver starts to release the braking operation member BP, the target electricity amount Imt decreases as the operation amount Bpa decreases, and the actual pressing force Fba also starts to decrease. When the condition of the actual pressing force Fba being equal to or less than the upper value fbu (Fba≤fbu) is met, the target electricity amount Imt is maintained at a constant value im2

(a value equal to or larger than the upper limit value ipm) to stop the rotary motion of the ratchet wheel RCH (that is, the electric motor MTR). Here, a time point u3 corresponds to the "initiation of the operation of the lock mechanism LOK".

At the time point u3 and thereafter, processes similar to those at the time point t3 and thereafter in the case of FIG. 8A are executed. At a time point u4 when the halted state of the gear rotation angle Rka is confirmed to have continued over the predetermined time tx1, the electricity application to the solenoid SOL is started to interlock the hook member TSU with the ratchet wheel RCH. To ensure that the hook member TSU presses the ratchet wheel RCH, the electricity application to the solenoid SOL in the state of maintaining the target electricity amount Imt is continued over the predetermined time tx2. Here, the value of the gear rotation angle Rka for the case where the gear rotation angle Rka maintains its constant state is stored (set) as the retention value rk1. At a time point t5 when the predetermined time tx2 has elapsed, the electric motor MTR is driven in reverse (rotation in the Rvs direction) so as to ensure the interlock between the hook member TSU and the ratchet wheel RCH. Specifically, the target electricity amount Imt is reduced dynamically from the value im1 to zero at the time point t5. Then, at the time point t5 and thereafter, the target electricity amount Imt is gradually reduced to a negative direction (direction by which the electric motor MTR is driven in reverse) at a decreasing gradient kg0 relative to time. From the time point u5, when the state in which the deviation between Rka and the retention value rk1 is less than the predetermined value hr1 has continued over the predetermined time tx3, the electricity application to the solenoid SOL and the electric motor MTR is stopped at a time point u6, and the interlocking process of the engagement operation state is completed. Here, the gear rotation angle Rka at the time point u6 is stored (set) as the release value rk0.

Here, in FIGS. 8A and 8B, the time points t1 to t3 and the time points u1 to u3 correspond to the pressing force adjusting process of the engagement operation. Further, the time points t3 to t4 and the time points u3 to u4 correspond to the gear stopping process, the time points t4 to t5 and the time points u4 to u5 correspond to the pawl pressing process, and the time points t5 to t6 and the time points u5 to u6 correspond to the interlock confirming process, respectively. (See FIG. 4.)

As shown in FIG. 8A, at the time point when the parking switch PSW is switched from off to on (in a corresponding calculation cycle, which will be termed a switching time point), in the case where the actual pressing force Fba is smaller than the lower value fbs, the electric motor MTR is driven by the control means CTL until the actual pressing force Fba becomes equal to or larger than the lower value fbs. Then, the operation of the lock mechanism LOK is initiated at the time point when the condition that the actual pressing force Fba is equal to or larger than the lower value fbs is satisfied (calculation cycle).

In the electric braking device DSS which prioritizes the service brake control based on the driver's operation on the braking operation member BP over the parking brake control, when the lock mechanism is operated (for example, the ratchet wheel RCH and the hook member TSU are interlocked) at the switching time point in a state where the operation amount Bpa is large and the actual pressing force Fba is excessively large (for example, the case where the actual pressing force Fba is larger than the upper value fbu), the parking brake enters the engagement maintaining state with the excessively large pressing force Fba. When the braking means BRK is designed to address such a situation, an overall size of the device may become large in order to secure strength.

To solve the above problem, as shown in FIG. 8B, in the case where the actual pressing force Fba is larger than the upper value fbu at the switching time point when the parking switch PSW has been switched from off to on (in the calculation cycle in which the switching has taken place), the operation of the lock mechanism LOK is not initiated immediately at the switching time point. The operation of the lock mechanism LOK is initiated after having waited for the driver to reduce the operation amount Bpa of the braking operation member BP and the actual pressing force Fba to become equal to or less than the upper value fbu. According to this, the driver's braking operation is prioritized even in the case where the braking operation member BP is strongly operated, and the parking brake is brought to the engagement maintaining state with an appropriate pressing force (the pressing force being within the range between the predetermined value fbs and value fbu), so the device can be reduced of its size and weight.

In the foregoing description, the interlocking process is performed based on the output (gear rotation angle) Rka of the gear rotation angle acquiring means RKA fixed to the ratchet wheel RCH. Since the ratchet wheel RCH and the electric motor MTR are connected coaxially or via the reduction gear GSK, the motor rotation angle acquiring means MKA may be employed as the gear rotation angle acquiring means RKA and the interlocking process may be performed based on the motor rotation angle Mka.

<Second Embodiment of Parking Brake Lock Mechanism>

Figure 9:
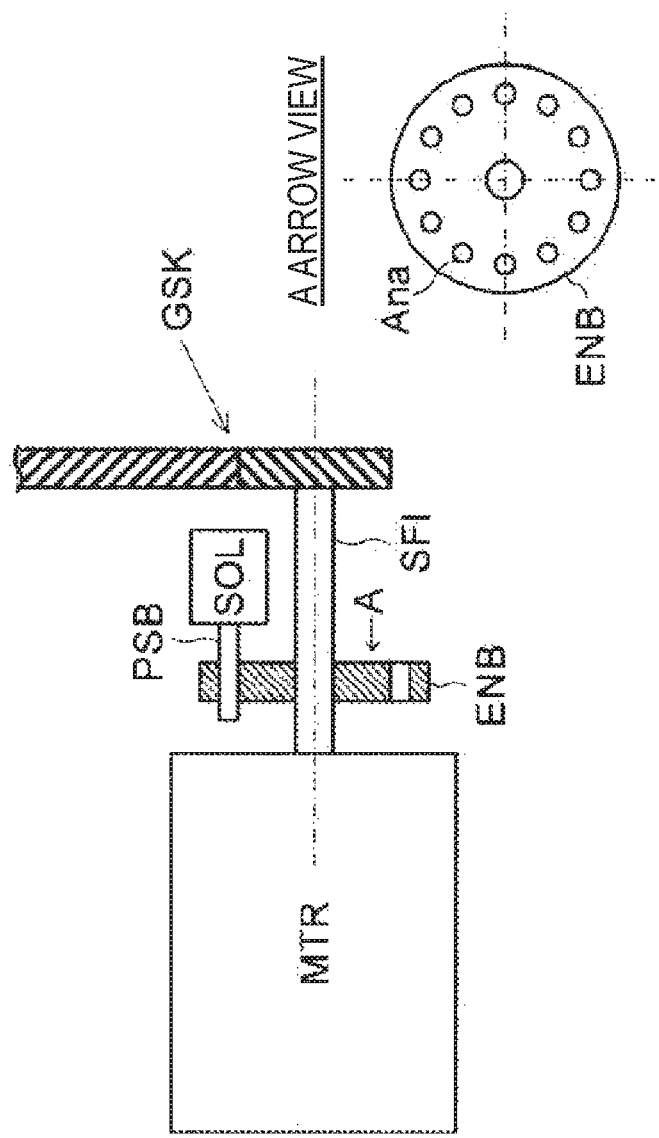
FIG. 9 is a schematic diagram for explaining a second embodiment of the lock mechanism for the parking brake.

A second embodiment of the parking brake lock mechanism LOK will be described with reference to a schematic diagram of FIG. 9. In the first embodiment, the rotation of the electric motor MTR is locked by interlocking the hook member TSU and the ratchet wheel RCH; however, in the lock mechanism LOK according to the second embodiment exhibits its parking brake function by interlocking the push bar PSB of the solenoid actuator SOL and a disk member ENB. Similarly to the first embodiment, a case where the push bar PSB and the disk member ENB are interlocked (case where the rotation of the electric motor MTR is locked and the lock mechanism LOK is operating) is the state in which the parking brake is actuated, and a case where the push bar PSB and the disk member ENB are not interlocked (case where the electric motor MTR can freely rotate and the lock mechanism LOK is not operating) is the state in which the parking brake is not actuated.

The parking brake lock mechanism LOK is configured of the disk member ENB and the solenoid actuator SOL. The disk member ENB is fixed to the input member SFI (that is, an output shaft of the electric motor MTR). As shown by an A arrow view, the disk member ENB is provided with a plurality of holes Ana. Each of the holes Ana is configured capable of inserting the push bar PSB of the solenoid SOL (see FIGS. 3A, 3B). Since the solenoid SOL is fixed to the caliper CRP, the rotary motion of the electric motor MTR is locked (constrained) by the push bar PSB being inserted to a hole Ana of the disk member ENB. In a case where the push bar PSB is not inserted to a hole Ana of the disk member ENB, the rotation of the electric motor MTR is not restricted and thus it can freely rotate.

An engagement operation of the push bar PSB and the disk member ENB is identical to the engagement operation of the hook member TSU and the ratchet wheel RCH, and thus a detailed description thereof will be omitted. In the explanations using FIGS. 7 and 8, the engagement operation of the push bar PSB and the disk member ENB (an insertion operation of the push bar PSB into a round hole Ana) can be explained by substituting the hook member TSU to the push bar PSB and the ratchet wheel RCH to the disk member ENB, respectively. The second embodiment also achieves same effects as the first embodiment.

The invention claimed is:

1. An electric braking device for a vehicle, the device comprising:
   an electric motor configured to press a friction member against a rotary member, the rotary member rotating integrally with a vehicle wheel of the vehicle, in accordance with an operation amount of a braking operation member performed by a driver of the vehicle;
   a lock mechanism configured to actuate a parking brake in the vehicle by locking rotation of the electric motor in accordance with a signal of a parking switch operated by the driver of the vehicle;
   a pressing force acquiring means configured to acquire a pressing force by which the friction member presses the rotary member; and
   a control means configured to drive the electric motor and the lock mechanism,
   wherein
   in a case where the pressing force is smaller than a preset lower value when the parking switch is switched from off to on, the control means increases an amount of electricity to the electric motor and starts an operation of the lock mechanism to actuate the parking brake when the pressing force becomes equal to or greater than the lower value; and
   in a case where the pressing force is greater than a preset upper value which is equal to or greater than the lower value when the parking switch is switched from off to on, the control means starts the operation of the lock mechanism to actuate the parking brake when the control means decreases the amount of electricity to the electric motor and the pressing force becomes equal to or smaller than the upper value.

2. An electric braking device for a vehicle, the device comprising:
   an electric motor configured to press a friction member against a rotary member, the rotary member rotating integrally with a vehicle wheel of the vehicle, in accordance with an operation amount of a braking operation member performed by a driver of the vehicle;
   a lock mechanism configured to actuate a parking brake in the vehicle by locking rotation of the electric motor in accordance with a signal of a parking switch operated by the driver of the vehicle; and
   a pressing force acquiring means configured to acquire a pressing force by which the friction member presses the rotary member, wherein
   in a case where the pressing force is smaller than a preset lower value when the parking switch is switched from off to on, an amount of electricity to the electric motor is increased and an operation of the lock mechanism to actuate the parking brake is started when the pressing force becomes equal to or greater than the lower value, and
   in a case where the pressing force is greater than a preset upper value which is equal to or greater than the lower value when the parking switch is switched from off to on, the operation of the lock mechanism to actuate the parking brake is started when the amount of electricity to the electric motor is decreased and the pressing force becomes equal to or smaller than the upper value.

* * * * *